United States Patent
Sugiyama et al.

(10) Patent No.: US 6,803,140 B2
(45) Date of Patent: Oct. 12, 2004

(54) GALLATE BASED COMPLEX OXIDE ELECTROLYTE MATERIAL

(75) Inventors: Tatsuo Sugiyama, Kanagawa-ken (JP); Kazuo Matsuo, Kanagawa-ken (JP); Fumio Munakata, Kanagawa-ken (JP); Yoshio Akimune, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 182 days.

(21) Appl. No.: 09/939,577

(22) Filed: Aug. 28, 2001

(65) Prior Publication Data

US 2002/0025468 A1 Feb. 28, 2002

(30) Foreign Application Priority Data

Aug. 28, 2000 (JP) ..................................... P2000-257590

(51) Int. Cl.[7] .............................................. H01M 8/10
(52) U.S. Cl. ............................. 429/33; 429/30; 429/46; 429/29; 501/152; 252/62.2; 252/62.57; 252/521.1
(58) Field of Search ............................. 429/33, 30, 40, 429/41, 46, 29, 218.2; 501/126, 152; 96/40, 6, 406; 252/519.1, 521.1, 521.2, 62.262, 62.5, 62.7, 62.57; 428/701

(56) References Cited

U.S. PATENT DOCUMENTS 6,090,500 A * 7/2000 Ishihara et al. ................ 429/33
6,337,006 B1 * 1/2002 Fujita et al. ................. 204/421
6,447,944 B1 * 9/2002 Akimune et al. ............. 429/33

FOREIGN PATENT DOCUMENTS

| EP | 1 081 782 A2 | 3/2001 |
|---|---|---|
| JP | 57-50748 | 10/1982 |
| JP | 57-50749 | 10/1982 |
| JP | 11-335164 | 12/1999 |
| JP | 2000-1316 | 1/2000 |
| JP | 2000-44340 | 2/2000 |
| JP | 2000-108245 | 4/2000 |
| WO | WO 98/22392 | 5/1998 |

OTHER PUBLICATIONS

Ishihara, T., et al. "Oxide Ion Conductivity in Doubly Doped $PrGaO_3$ Perovskite–Type Oxide", Journal of the Electrochemical Society, May 1999, Electrochemical Society, vol. 146, No. 5, pp. 1643–1649, XP002256724 ISSN: 0013–4651.

(List continued on next page.)

*Primary Examiner*—Bruce F. Bell
*Assistant Examiner*—Monique Wills
(74) *Attorney, Agent, or Firm*—McDermott Will & Emery LLP (57) ABSTRACT

A solid electrolyte material contains an A site-deficient complex oxide represented by a chemical formula $A_{1-\alpha}BO_{3-\delta}$, in which a B site contains at least Ga. This solid electrolyte material has stability, high oxide-ion conductivity at low temperature and high toughness. A method of manufacturing the solid electrolyte material, comprises: mixing oxide materials of respective constituent elements; baking temporarily the mixed materials at 1100 to 1200° C. for 2 to 10 hours; grinding the temporarily baked materials to powder; molding the powder; and sintering the molded powder. A solid oxide fuel cell, has: the solid electrolyte material; a cathode electrode formed on one surface of the solid electrolyte material; and an anode electrode formed on the other surface of the solid electrolyte material. The solid oxide fuel cell has a stable and long operation at low temperature.

8 Claims, 7 Drawing Sheets

OTHER PUBLICATIONS

Choi, S. M., et al., "Oxygen Ion Conductivity And Cell Performance of $La_{0.9}Ba_{0.1}Ga_{1-x}Mg_xO_{3-\delta}$ Electrolyte", Solid State Ionics, North Holland Pub. Company. Amsterdam, NL, vol. 131, No. 3–4, Jun. 2, 2000, pp. 221–228, XP004210059 ISSN: 0167-2738.

Huang, K., et al., "A Solid Oxide Fuel Cell Based on Sr– and Mg–Doped $LaGaO_3$ Electrolyte: The Role of a Rare–Earth Oxide Buffer", Journal of Alloys and Compounds, Elsevier Sequioa, Lausanne. Ch, vol. 303–304, May 2000, pp. 454–464, XP004204403 ISSN: 0925-8388.

Huang, P. N., et al., "Processing And Conductivity of Lanthanum Gallate", Electrochemical Society Proceedings, Electrochemical Society, Pennington, N.J. US, vol. 99–19, 1999, pp. 285–291, XP002965205 ISSN: 0161-6374.

"High oxide ion conduction in sintered oxides of the system $Bi_2O_3$–$Y_2O_3$", T. Takahashi et al., Journal of Applied Electrochemistry 5, pp. 187–195 (1975).

"Mixed Electrical Conduction in the Fluoride–Type $Ce_{1-x}Gd_xO_{2-x/2}$", T. Kudo et al., J. Electrochem. Soc. Vol. 123, No. 3, pp. 415–419 (1979).

"Doped $LaGaO_3$ Perovskite Type Oxide as a New Oxide Ionic Conductor", T. Ishihara et al., J. Am. Chem. Soc., vol. 116, pp. 3801–3803 (1994).

"A superior oxide–ion electrolyte", M. Feng et al., Eur. J. Solid State Inorg. Chem, t.31, pp. 663–672 (1994).

* cited by examiner

GALLATE BASED COMPLEX OXIDE ELECTROLYTE MATERIAL

BACKGROUND OF THE INVENTION

1. Field of the Invention

The present invention relates to a gallate based complex oxide solid electrolyte material, a method of manufacturing the same and a solid oxide fuel cell.

2. Description of the Related Art

A solid oxide fuel cell (SOFC) has been constantly improved since Baur and Preis drove the SOFC at 1000° C. in 1937 after Nernst discovered a solid electrolyte (SE) in 1899. Currently, a zirconia ceramic cell with a capacity of several kilowatts shows a driving performance of several thousand hours. Because the SOFC is usually driven at high temperature of 1000° C. or higher, a hydrocarbon based fuel gas can be subjected to internal reforming in the cell, and that a high combustion efficiency of 60% or higher can be thereby obtained.

Typically, the SOFC is composed of a solid electrolyte and a pair of electrodes formed on both surfaces of the solid electrolyte. The electrodes are porous bodies. On the surface of one electrode, a gas containing oxygen is supplied, and on the surface of the other electrode, a gas containing hydrogen is supplied. The oxygen supplied to one electrode migrates via the solid electrolyte as oxide ions and reacts with a hydrogen component on the other electrode side to generate an electric charge and water.

Constituent materials of the SOFC must be stable in an oxidation/reduction atmosphere. In addition, since the SOFC is operated at high temperature, thermal expansion coefficients of the constituent components must be approximate from one to another, and the constituent components must be very strong and toughness. Moreover, high conductivity is required for the electrodes, and selectively high oxide-ion conductivity is required for the solid electrolyte.

Currently, as a solid electrolyte, stabilized zirconia (ZrO2) is mainly used. As a stabilizer for the zirconia, oxide of two-valence alkaline earth metal such as CaO, MgO and $Sc_2O_3$, rare earth oxide such as $Y_2O_3$ and the like are used. Ion conductivity of $ZrO_2$ doped with CaO as alkaline earth metal is 0.01 $(\Omega cm)^{-1}$ at 800° C. In addition, ion conductivity of $ZrO_2$ doped with rare earth oxide, for example, $Y_2O_3$, $Yb_2O_3$, $Gd_2O_3$ is about $1 \times 10^{-1}$ to $1 \times 10^{-2}$ $(\Omega cm)^{-1}$ at 800° C. However in this case, when the temperature is 650° C. or lower, the ion conductivity becomes $2 \times 10^{-2}$ $(\Omega cm)^{-1}$ or lower.

The stabilized zirconia added with single rare earth has been publicly known since 1970. The stabilized zirconia added with the rare earth and the alkaline earth is disclosed in Japanese Laid-Open Patent Publications Sho 57-50748 (published in 1982) and Sho 57-50749 (published in 1982).

Besides the above, as a solid electrolyte material, stabilized bismuth oxide is also used. A high temperature phase (δ phase) of the bismuth oxide ($Bi_2O_3$) has a deficient fluorite structure, and exhibits a low activation energy for the migration of the oxide ions, but exhibits high oxide-ion conductivity. The high temperature phase of the bismuth can be stabilized to low temperature by dissolving the rare earth oxide thereinto, and exhibits high oxide-ion conductivity. In J. Appl. Electrochemistry, 5(3), pp. 187–195 (1975) by T. Takahashi, et al., described is that the oxide-ion conductivity of the rare metal stabilized bismuth, for example, $(Bi_2O_3)_{1-x}$ $(Y_2O_3)_x$, is 0.1 $(\Omega cm)^{-1}$ at 700° C. and 0.01 $(\Omega cm)^{-1}$ at 500° C., which is 10 to 100 times as high as that of the stabilized zirconia.

In Japanese Patent Publication Sho 62-45191(published in 1987), disclosed is that a mixture of the stabilized bismuth oxide and the stabilized zirconia has an oxideion conductivity of 0.1 $(\Omega cm)^{-1}$ or higher at 700° C. In this case, it can be expected that high ion conductivity is obtained in a temperature range lower than 1000° C. However, since the mixture is reduced and Bi metal is deposited in a reduction atmosphere. This Bi metal deposition exhibits electronic conductivity, thus making it difficult to use the mixture as a solid electrolyte.

As another solid electrolyte, there is a ceria based solid solution. Ceria ($CeO_2$) has a fluorite cubic structure in a temperature range from room temperature to its melting point. When rare metal or CaO is added to the oxide, a solid solution is formed in a wide temperature range. This ceria based solid solution has been reported by Kudo, Obayashi, et al (J. Electrochem., Soc., 123[3] pp. 416–419, (1976)). With regard to $CeO_2$–$Gd_2O_3$ based solid solution, which is a topic compound in the recent research, a structure thereof is represented as $Ce_{1-x}Gd_xO_{2-x/2}$, where oxide vacancies are formed. Since the valence of Ce is varied in this $CeO_2$–$Gd_2O_3$ based solid solution, the solid solution is reduced to Ce metal in a reduction atmosphere similarly to the bismuth base, and exhibits the electronic conductivity. Accordingly, it is difficult to use the solid solution as a solid electrolyte.

As still another solid electrolyte material usable at low temperature, there is a perovskite compound, on which research and development have been conducted. The perovskite compound is typically represented by a chemical formula ABO3, which includes, for example, $Ba(Ce_{0.9}Gd_{0.1})O_3$, $(La_{0.9}Sr_{0.1})(Ga_{0.8}Mg_{0.2})O_3$, $(Ca_{0.9}Al_{0.1})TlO_3$, $Sr(Zr_{0.9}Sc_{0.1})O_3$ and the like. Moreover, with regard to the $(La_{1-x}Sr_x)(Ga_{1-y}Mg_y)O_3$ based perovskite compounds have been reported in J. Am. Chem. soc., 116, pp. 3801–3803 (1994) by T. Ishihara, et al. and Eur. J. Solid State Inorg. Chem. t. 31, pp. 663–672 (1994) by M. Feng and J. B. Goodenough. Each of the compounds is expected to exhibit high oxide-ion conductivity in the oxidation-reduction atmosphere at low temperature.

SUMMARY OF THE INVENTION

Since an output of a single cell is just few volts, the conventional cell must be constructed in a laminated structure in order to obtain a high voltage. The laminated ceramic cell thus constructed becomes large in size, thus making a system designing difficult. Therefore it is desire to use a metal part such as ferrite based stainless steel for a vessel of a combustor body.

Accordingly, it is required to develop a solid oxide fuel cell operatable at low temperature of about 600 to 700° C. at which a stainless steel material can be used. Also for the solid electrolyte material, selective high oxide-ion conductivity at low temperature is desired.

For example, the zirconia based solid electrolyte material conventionally used as a main solid electrolyte exhibits low oxide-ion conductivity at low temperature. Meanwhile, the bismuth or ceria based solid electrolyte material is apt to be reduced, and the electronic conductivity thereof is increased by the reduction. Therefore, both of the materials are not suitable for the solid electrolyte for the fuel cell.

Meanwhile, the gallate based perovskite compound material exhibits superior oxide-ion conductivity at low temperature as compared with the other compounds. However at low temperature, the electronic conductivity is increased as well as the oxide-ion conductivity, leading to the exhibition of the mixed electric conductivity. Therefore, there occurs a problem that a ratio of relative oxide-ion conduction, that is, a transport number, is lowered.

Accordingly, an object of the present invention is to provide a solid electrolyte material in which oxide-ion conductivity is stable and high even at low temperature, particularly to provide a gallate based complex oxide material that has the stable and high oxide-ion conductivity at low temperature.

Another object of the present invention is to provide a method of manufacturing the gallate based complex oxide material.

Still another object of the present invention is to provide a solid oxide fuel cell operatable at low temperature.

A first aspect of the present invention provides a solid electrolyte material that comprises an A site-deficient complex oxide represented by a chemical formula $A_{1-\alpha}BO_{3-\delta}$, in which the B site contains at least Ga.

In accordance with the solid electrolyte material of the present invention, because the B site contains Ga in the solid electrolyte material, high oxide-ion conductivity appears at low temperature. Moreover, by adopting the A site-deficient structure, the oxide-ion conductivity is further improved, and the electronic conductivity is suppressed. Furthermore, the A site-deficient structure makes the crystal structure more flexible and makes the structure stabilized, thus making it possible to enhance the toughness and the durability.

A second aspect of the present invention provides a method of manufacturing the solid electrolyte material that comprises mixing oxide materials of respective constituent elements; baking temporarily the mixed materials at 1100 to 1200° C. for 2 to 10 hours; grinding the temporarily baked materials; molding the ground materials; and sintering the molded materials.

In accordance with the method of manufacturing of the present invention, the solid electrolyte material of the present invention containing the A site-deficient complex oxide represented by the chemical formula $A_{1-\alpha}BO_{3-\delta}$ can be prepared.

A third aspect of the present invention is a solid oxide fuel cell that comprises a solid electrolyte using the solid electrolyte material having the above-described first aspect; a cathode electrode formed on one surface of the solid electrolyte; and an anode electrode formed on the other surface thereof.

In accordance with the solid oxide fuel cell of the present invention, the solid oxide fuel cell stably operatable at low temperature can be provided.

DETAILED DESCRIPTION OF THE EMBODIMENTS

Figure 1:
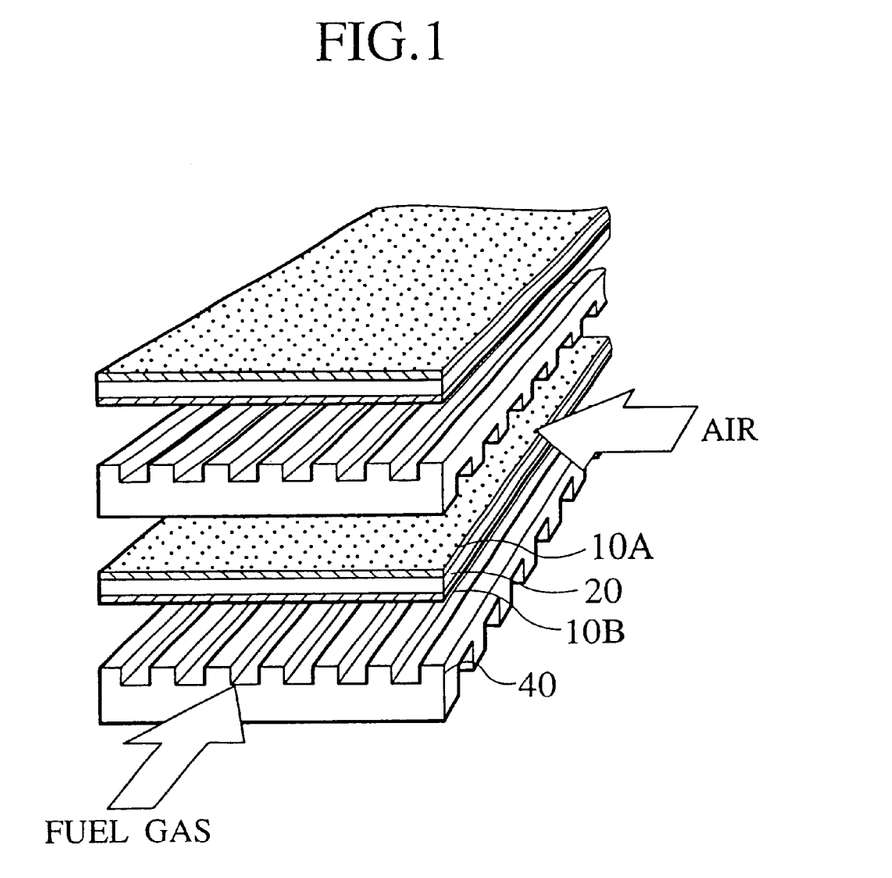
FIG. 1 is a perspective view showing a constitutional example of a solid oxide fuel cell in an embodiment of the present invention.

FIG. 1 is a partial perspective view of a device showing a constitutional example of a solid oxide fuel cell according to this embodiment. A single cell of the solid oxide fuel cell is composed of an air electrode (cathode) 10A, a fuel electrode (anode) 10B, and a solid electrolyte 20 interposed between the two electrodes. For use thereof, a plurality of cells are laminated with separators 40 interposed therebetween according to needs.

When the fuel cell is operated, an oxygen-containing gas is supplied to the air electrode, and a hydrogen-containing gas is supplied to the fuel electrode. The oxygen supplied to the air electrode is incorporated into the electrode as oxide ions, migrates in the solid electrolyte to reach the fuel electrode, reacts with hydrogen there, and discharges an electric charge as well as generates water.

A gallate based complex oxide of this embodiment is used as a material of the solid electrolyte 20 of the solid oxide fuel cell. Hereinbelow, description will be specifically made for a feature thereof.

First, the solid electrolyte material of this embodiment is a complex oxide constructed in a perovskite structure, in which the A site has deficiency and the B site contains at least Ga. The solid electrolyte material is represented in the following chemical formula (f1). Specifically, the solid electrolyte material is an A site-deficient gallate based perovskite complex oxide:

Because Ga is contained in the B site, high oxide-ion conductivity can be obtained at low temperature. Deficient portions of the A site form the oxide vacancies efficiently to promote the generation of holes and to promote the migration of the oxide ions through the oxide vacancies. Therefore, such A site-deficient structure can enhance the oxide-ion conductivity. Moreover, since the deficiency of the A site makes the crystal structure more flexible, the toughness of the crystal to thermal distortion is enhanced. Accordingly, the solid electrolyte material good in heat resistance and durability can be provided.

Moreover, it is preferable that the A site-deficient gallate based perovskite complex oxide be represented by the following formula (f2):

Specifically, the A site is represented as $(A'_{1-x}A''_x)_{1-\alpha}$, and the B site is represented as $(Ga_{1-y}B'_y)$. Furthermore, it is preferable that the A' site be at least one kind of element selected from the group consisting of 3-valence rare earth elements and Y, that the A" site contain at least one kind of element selected from the group consisting of 2-valence alkaline earth metal elements such as, for example, Sr, Ca and Ba, and that the B' site be Mg and/or Zn.

By substituting the two-valence element for a part of the three-valence element in the A site, conductive holes by the oxide vacancies are introduced, thus enabling the ion conductivity to be enhanced. Even though Ga of the B site is originally an element difficult to contribute to the electronic conductivity, in addition, substituting Mg or Zn for a part of Ga can suppress the electronic conductivity. Also the A site-deficient structure contributes to suppress the electronic conductivity. Accordingly the transport number of the oxide ions can be enhanced.

Here, when the A site-deficient quantity $\alpha$ is 0, the effect of the deficiency is not exhibited. And when $\alpha$ exceeds 0.2, the crystal structure becomes unstable, a quantity of the oxide vacancies capable of contributing to the ion conduction is decreased, and thus the oxide-ion conductivity is lowered. Therefore, it is preferable that a satisfy the following condition:

$0<\alpha<0.2$

Furthermore, in order to obtain higher ion conductivity, it is preferable that $\alpha$ satisfy the following condition:

$0.05 \leq \alpha < 0.15$

Moreover, when $\delta$ exceeds 0.5, since the perovskite compound is not formed, the ion conductivity is lowered, which is not preferable. Therefore, it is preferable that $\delta$ satisfy the following condition:

$0<\delta<0.5$

Furthermore, in order to obtain higher ion conductivity, it is preferable that $\delta$ satisfy the following condition:

$0.2 \leq \delta \leq 0.4$

Moreover, it is preferable that the A" element substitution quantity: x and the B' element substitution quantity: y satisfy the following conditions, respectively, in order to obtain higher oxide-ion conductivity by valence control.

$0<x<0.2$ $0<y<0.2$

Furthermore, it is preferable that the A site-deficient gallate based perovskite complex oxide be represented by the following formula (f3):

$$(A'''_{1-x-z}A''_xA''''_z)_{1-\alpha}Ga_{1-y}B_yO_{3-\delta} \qquad (f3)$$

Specifically, the A site is represented as $(A'''_{1-x-z}A''_xA''''_z)_{1-\alpha}$. It is preferable that A''' site be La, and that the A'''' site be at least one selected from the group consisting of Nd, Sm, Gd and Y.

Note that it is preferable here that the A" element substitution quantity: x, B element substitution quantity: y and the A'''' element substitution quantity: z satisfy the following conditions, respectively. When these conditions are satisfied, the transport number of the oxides can be enhanced:

$0<x<0.2$ $0<y\leq 0.2$ $0<z\leq <0.2$

It is preferred to adopt the constitution as described above in terms of forming a continuous solid solution. And by adopting the constitution, the solid electrolyte can be made stable, the quantity of the oxide ions flowing in a grain boundary can be decreased, and more oxide ions can be made to flow in grains.

Moreover, the solid solution obtained by adding rare earth oxide to the above gallate based complex oxide is constructed in a "fluorite" structure. Distortion of a lattice is caused depending on an atomic radius of the added element, and for each element, there exists an optimal value of the additional quantity. Since the optimal value thereof ranges narrowly, it is important to set a flat electric characteristic by adding two or more kinds of elements. It is important to maintain the crystal structure because the characteristic is greatly changed when the composition is partially shifted due to thermal diffusion of the added element.

The solid electrolyte material according to this embodiment described above is prepared in a series of steps for the oxide materials of the respective constituent elements, which includes, for example, a mixing step, a synthesizing (temporary baking) step, a grinding step, a forming step and a sintering step.

Hereinbelow, description will be made for a method of manufacturing the solid electrolyte material.

First, the following materials are weighed and mixed: as materials of the A site, one or more selected from $La_2O_3$, $Y_2O_3$, $Yb_2O_3$, $Gd_2O_3$, $Sm_2O_3$, $Nd_2O_3$ and the like; one or more selected from Sr, Ba and Ca; and as materials of the B site, Ga and Mg and/or Zn.

In this case, it is preferable to add two or more kinds of the rare earth oxides simultaneously in terms of stabilizing the characteristic. Then, the mixture is ground in an alcoholic liquid by a ball mill so as to have an average grain diameter of 2 μm or less, and thus slurry is obtained. It is preferable to set an average grain diameter of the powder obtained this time at 2 μm or less. When the average grain diameter exceeds 2 μm, a solid phase reaction in the baking and synthesizing step becomes insufficient, or a solid solution concentration is varied, and thus the characteristic value is not stabilized.

The slurry is dried, further temporarily baked in the atmosphere for 2 to 10 hours at about 1100 to 1200° C. to be subjected to the solid phase reaction. If the temporary baking temperature is lower than 1100° C., the solid phase reaction becomes insufficient, and if the temperature exceeds 1200° C., the slurry is partially sintered resulting in the uneven solid phase reaction. Note that the temporary baking temperature is adjusted in accordance with a kind of added stabilizer. Moreover, when the temporary baking time is less than 2 hours, the solid phase reaction becomes insufficient, and when the time exceeds 10 hours, grain growth is caused.

The material having subjected to the solid phase reaction is ground again by the ball mill in alcohol so as to have an average grain diameter of 0.6 μm or less, dried by a spray dryer and the like, and made into powder. It is preferable that the powder grain diameter at this time be set in a range from 0.5 to 0.8 μm by measurement using a laser beam. If the grain diameter is less than 0.5 μm, a pressing step cannot be performed for the material, and if the grain diameter exceeds 0.8 μm, the sintering becomes insufficient, and the vacancies remain in the solid electrolyte, thus causing lowering of the strength.

The powder thus obtained is pressed, for example, in a metal mold, and molded with a pressure of 2 to 4 ton/cm² by a hydrostatic press, further sintered in the atmosphere for 2 to 8 hours at 1350 to 1550° C. Thus, a sintered body of the solid electrolyte can be obtained. During the sintering, it is better to use a setter made of the same material as the sintered material and a case made of alumina. The setter may be made of alumina. If the sintering temperature is less than 1350° C., the sintering becomes insufficient, and the vacancies remain. If the temperature exceeds 1550° C., the sintering becomes excessive, and an intercrystalline crack is caused. Moreover, when the sintering time is less than 2 hours, the sintering becomes insufficient, and the vacancies remain, and when the sintering time exceeds 8 hours, the sintering becomes excessive, and the inter crystalline crack is caused.

With regard to the size of the crystal grain having been sintered, the average grain diameter should be set 2 to 12 μm, preferably 2 to 10 μm. The average grain diameter is obtained by calculating an average length of grains in an electron microscope picture, across which 10 (optional) parallel lines are laid. When the average grain diameter is larger than 12 μm, the strength lowering is caused, and when the average grain diameter is less than 2 μm, it is difficult to obtain high toughness. Therefore, the average grain diameter of the crystal grain is preferably set in a range from 2 to 10 μm.

The solid electrolyte prepared in the above-described manner has high oxide-ion conductivity and high transport number of ions at low temperature, and further has high toughness. Accordingly, when the solid electrolyte is used as a solid electrolyte of the solid oxide fuel cell as shown in FIG. 1, the fuel cell stably operatable for a long time under the condition of low temperature ranging from 500 to 800° C. can be provided. Moreover, the solid oxide fuel cell can provide a stable characteristic even when temperatures are varied depending on points. Furthermore, since the solid oxide fuel cell can be operated at low temperature, pipe parts made of such as stainless steel can be used. Therefore, the solid oxide fuel cell in this embodiment is suitable for a large fuel cell system.

Furthermore, the solid electrolyte material in this embodiment can also be applied to a solid electrolyte oxygen sensor attached into an exhaust pipe of a vehicle for engine control. This oxygen sensor must be operated in a range from low temperature at an engine start to high temperature. When the solid electrolyte in this embodiment is used therefor, the oxygen sensor can exhibit a stable characteristic.

In addition, the solid electrolyte material in this embodiment can be used not only as a material for the oxygen sensor attached to the exhaust pipe of the vehicle but also as an oxygen sensor used during metal melting.

EXAMPLES

Example 1

A solid electrolyte was prepared with a gallate based oxide represented as $(La_{0.9}Sr_{0.1})_{0.9}Ga_{0.8}Mg_{0.2}O_{3-\delta}$.

This solid oxide was prepared by the use of a manufacturing method as follows. First, the respective materials ($La_2O_3$, $SrCO_3$, $Ga_2O_3$ and MgO) are weighed so as to satisfy the proportion of the above chemical formula, ground and mixed in alcohol for 24 hours by a ball mill so as to have an average grain diameter of 2.0 μm or less. Thus, slurry was prepared. The slurry was dried, and temporarily baked at 1150° C. for 4 hours in the atmosphere. The temporarily baked material was ground again in alcohol by the ball mill so as to have an average grain diameter of 0.6 μm or less, and then dried. The powder thus obtained was pressed in a metal mold, and molded with a pressure of 2 ton/cm² by a hydrostatic press. Further, the article thus molded was sintered at 1450° C. for 6 hours. Thus, the solid electrolyte was obtained.

Example 2

A solid electrolyte was prepared with a gallate based oxide represented as $(La_{0.8}Sr_{0.2})_{0.875} Ga_{0.8}Mg_{0.2}O_{3-\delta}$. The same manufacturing conditions as those of the example 1 were used other than the mixing ratio of the materials.

Example 3

A solid electrolyte was prepared with a gallate based oxide represented as $(La_{0.8}Sr_{0.2})_{0.9}Ga_{0.8}Mg_{0.2}O_{3-\delta}$. The same manufacturing conditions as those of the example 1 were used other than the mixing ratio of the materials.

Example 4

A solid electrolyte was prepared with a gallate based oxide represented as $(La_{0.9}Sr_{0.1})_{0.85} Ga_{0.8}Mg_{0.2}O_{3-\delta}$. The same manufacturing conditions as those of the example 1 were used other than the mixing ratio of the materials.

Example 5

A solid electrolyte was prepared with a gallate based oxide represented as $(La_{0.9}Ba_{0.1})_{0.875}Ga_{0.8}Mg_{0.2}O_{3-\delta}$. As materials, $La_2O_3$, $BaCO_3$, $Ga_2O_3$ and MgO were used. Other than the above, the same manufacturing conditions as those of the example 1 were used.

Example 6

A solid electrolyte was prepared with a gallate based oxide represented as $(La_{0.9}Ca_{0.05}Sr_{0.5})_{0.875}Ga_{0.8}Mg_{0.2}O_{3-\delta}$. As materials, $La_2O_3$, $CaCO_3$, $SrCO_3$, $Ga_2O_3$ and MgO were used. Other than the above, the same manufacturing conditions as those of the example 1 were used.

Example 7

A solid electrolyte was prepared with a gallate based oxide represented as $(La0.8Ca0.05Sr_{0.05})_{0.875}Ga_{0.8}Mg_{0.2}O_{3-\delta}$. As materials, $La_2O_3$, $Gd_2O_3$, $SrCO_3$, $Ga_2O_3$ and MgO were used. Other than the above, the same manufacturing conditions as those of the example 1 were used.

Example 8

A solid electrolyte was prepared with a gallate based oxide represented as $(La_{0.7}Gd_{0.1}Y_{0.1}Sr_{0.1})_{0.875}Ga_{0.8}Mg_{0.2}O_{3-\delta}$. As materials, $La_2O_3$, $Gd_2O_3$, $Y_2O_3$, $SrCO_3$, $Ga_2O_3$ and MgO were used. Other than the above, the same manufacturing conditions as those of the example 1 were used.

Example 9

A solid electrolyte was prepared with a gallate based oxide represented as $(La_{0.8}Nd_{0.05}Gd_{0.05}Sr_{0.1})_{0.875}Ga_{0.8}Mg_{0.2}O_{3-\delta}$. As materials, $La2O3$, $Nd_2O_3$, $Gd_2O_3$, $SrCO_3$, $Ga_2O_3$ and MgO were used. Other than the above, the same manufacturing conditions as those of the example 1 were used.

Example 10

A solid electrolyte was prepared with a gallate based oxide represented as $(La_{0.8}Sm_{0.05}Gd_{0.05}Sr_{0.1})_{0.875}Ga_{0.8}Mg_{0.2}O_{3-\delta}$. As materials, $La_2O_3$, $Sm_2O_3$, $Gd_2O_3$, $SrCO_3$, $Ga_2O_3$ and MgO were used. Other than the above, the same manufacturing conditions as those of the example 1 were used.

Example 11

A solid electrolyte was prepared with a gallate based oxide represented as $(La_{0.9}Ba_{0.1})_{0.9}Ga_{0.9}Zn_{0.1}O_{3-\delta}$. As materials, $La_2O_3$, $Ba_2O_3$, $Ga_2O_3$ and ZnO were used. Other than the above, the same manufacturing conditions as those of the example 1 were used.

Example 12

The temporary baking reaction in the atmosphere after drying the slurry was performed at 1100 to 1200° C. for 2 to 20 hours, the ground average grain diameter in alcohol was set to be in a range from 0.5 to 0.8 µm, and the sintering was performed at 1350 to 1550° C. for 2 to 8 hours. Other than the above, the same manufacturing conditions as those of the example 1 were used to obtain the solid electrolyte.

Comparative Example 1

A solid electrolyte was prepared with a gallate based oxide represented as $(La_{0.9}Sr_{0.1})Ga_{0.8}Mg_{0.2}O_{3-\delta}$. The same manufacturing conditions as those of the example 1 were used other than the mixing ratio of the materials.

Comparative Example 2

A solid electrolyte was prepared with a gallate based oxide represented as $(La_{0.8}Sr_{0.2})Ga_{0.8}Mg_{0.2}O_{3-\delta}$. The same manufacturing conditions as those of the example 1 were used other than the mixing ratio of the materials.

Comparative Example 3

A solid electrolyte was prepared with a gallate based oxide represented as $(La_{0.9}Sr_{0.1})_{0.8}Ga_{0.8}Mg_{0.2}O_{3-\delta}$. The same manufacturing conditions as those of the example 1 were used other than the mixing ratio of the materials.

Comparative Example 4

A solid electrolyte was prepared with a gallate based oxide represented as $(La_{0.9}Sr_{0.1})_{0.9}Ga_{0.8}Mg_{0.2}O_{3-\delta}$. The same manufacturing conditions as those of the example 1 were used other than the mixing ratio of the materials.

Comparative Example 5

A solid electrolyte was prepared with a gallate based oxide represented as $(La_{0.9}Ba_{0.1})Ga_{0.8}Mg_{0.2}O_{3-\delta}$. The same manufacturing conditions as those of the example 5 were used other than the mixing ratio of the materials.

Comparative Example 6

A solid electrolyte was prepared with a gallate based oxide represented as $(La_{0.9}Ca_{0.08}Sr_{0.05})Ga_{0.8}Mg_{0.2}O_{3-\delta}$. The same manufacturing conditions as those of the example 6 were used other than the mixing ratio of the materials.

Comparative Example 7

A solid electrolyte was prepared with a gallate based oxide represented as $(La_{0.9}Sr_{0.1})_{0.9}Ga_{0.1}O_{3-\delta}$. As materials, $La_2O_3$, $SrCO_3$ and $Ga_2O_3$ were used. Other than the above, the same manufacturing conditions as those of the example 1 were used.

Comparative Example 8

A solid electrolyte was prepared with a gallate based oxide represented as $(La_{1.0})_{0.9}Ga_{0.8}Mg_{0.2}O_{3-\delta}$. As materials, $La_2O_3$, $Ga_2O_3$, and MgO were used. Other than the above, the same manufacturing conditions as those of the example 1 were used.

Comparative Example 9

A solid electrolyte was prepared with a gallate based oxide represented as $(La_{0.8}Gd_{0.1}Sr_{0.1})Ga_{0.8}Mg_{0.2}O_{3-\delta}$. The same manufacturing conditions as those of the example 7 were used other than the mixing ratio of the materials.

Comparative Example 10

A solid electrolyte was prepared with a gallate based oxide represented as $(La_{0.9}Ba_{0.1})Ga_{0.9}Zn_{0.1}O_{3-\delta}$. The same manufacturing conditions as those of the example 11 were used other than the mixing ratio of the materials.

Measuring method

Each of the solid electrolytes obtained in the examples (1 to 11) and the comparative examples (1 to 10) was processed into a shape of a bending test piece of JIS standard (JIS-R1601), and the ion conductivity thereof at 600° C. was measured by the use of the following evaluation method.

Here, the ion conductivity was measured by the use of the four terminal method with a direct current. Platinum lines were fixed onto the above JIS bending test piece with platinum paste so as to have an equal interval between each line, followed by baking at 1000° C. Thus, the test piece was prepared. The test piece was maintained at 600° C., followed by measurement of resistivity thereof, and the inverse number of the resistivity was defined as ion conductivity ($\sigma$). The conduction was assumed as conduction caused entirely by the oxide ions. As a calculation expression, the following formula was used.

$\sigma$(S/m)=current (A)×sectional area/voltage (V)×effective length of test piece Results The results are shown in FIGS. 2 to 7.

Figure 2:
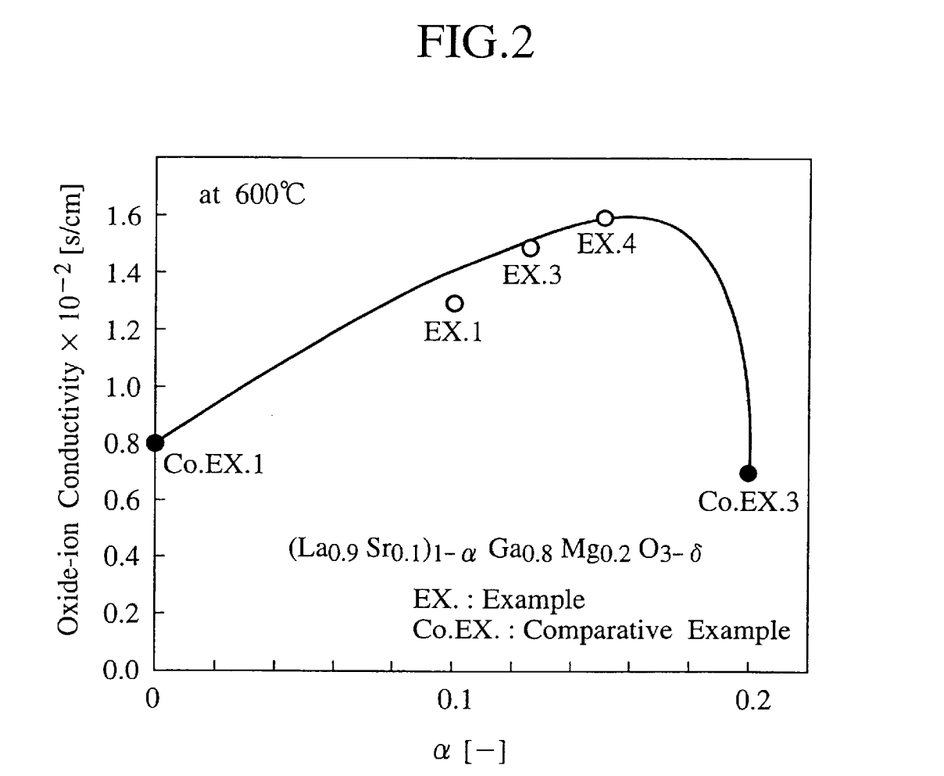
FIG. 2 is a graph showing the relationship between A site-deficient quantities (a) and oxide-ion conductivities in $(La_{1-x}Sr_{0.1})_{1-\alpha}Ga_{0.8}Mg_{0.2}O_{3-\delta}$ in each of examples and comparative examples.

FIG. 2 shows the relationship between the A site-deficient quantities a and the ion conductivities of the gallate based complex oxide represented by the chemical formula $A_{1-\alpha}BO_{3-\delta}$, more specifically, $(La_{0.9}Sr_{0.1})_{1-\alpha}Ga_{0.8}Mg_{0.2}O_{3-\delta}$. The oxide-ion conductivity depends on the value of $\alpha$. By setting a larger than 0, the oxide-ion conductivity is increased. Particularly, in a range of: $0<\alpha<0.2$, high oxide-ion conductivity is obtained.

Figure 3:
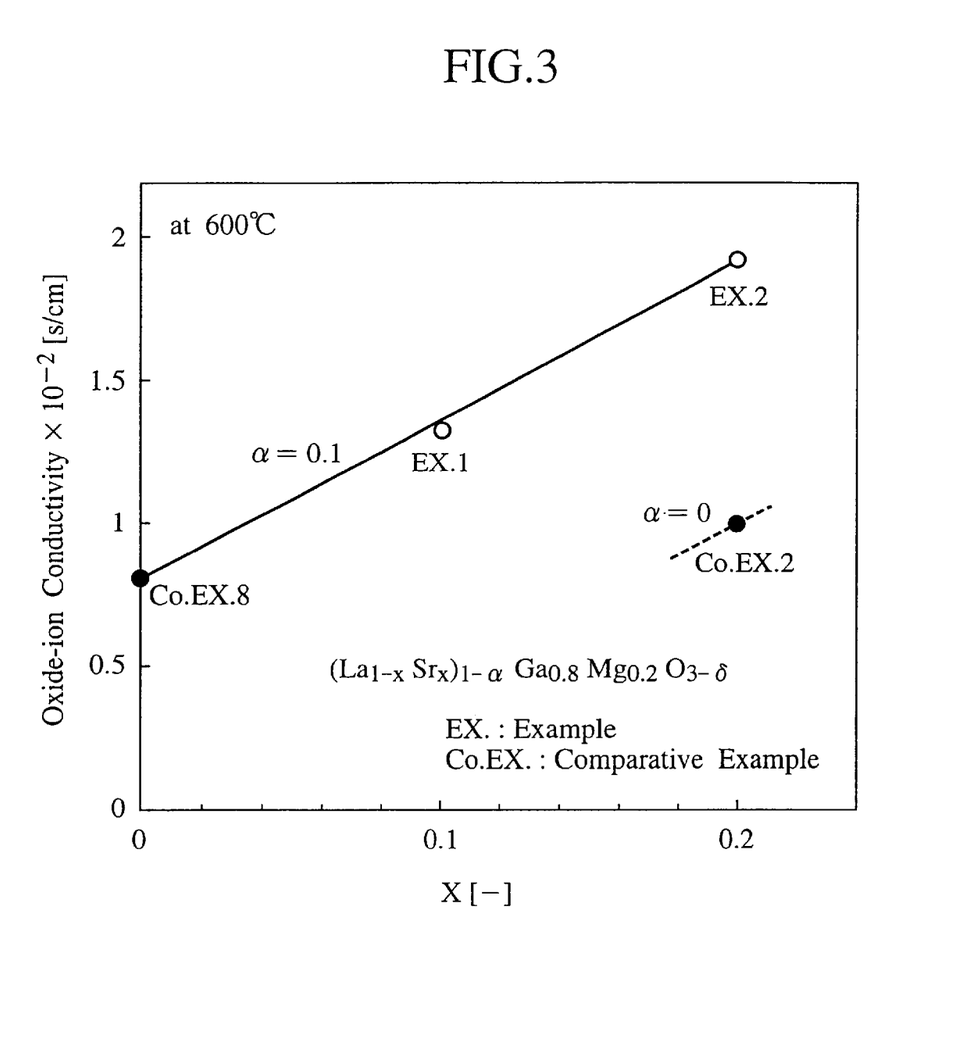
FIG. 3 is a graph showing the relationship among values of x, the A site-deficient quantities ($\alpha$) and the oxide-ion conductivities in $(La_{1-x}Sr_x)_{1-\alpha}Ga_{0.8}Mg_{0.2}O_{3-\delta}$ in each of the examples and the comparative examples.

FIG. 3 shows the relationship among values of x, the A site-deficient quantities a and the oxide-ion conductivities of the gallate based complex oxide represented by the chemical formula $(A'_{1-x}A''_x)_{1-\alpha}(Ga_{1-y}B'_y)O_{3-\delta}$, more specifically, $(La_{1-x}Sr_x)_{1-\alpha}Ga_{0.8}Mg_{0.2}O_{3-\delta}$. When a is 0.1, under the condition of: $0 \leq x \leq 0.2$, the larger the x value is, the higher the oxide-ion conductivity is. When $\alpha=0$, the oxide-ion conductivity is not very high even if the x value is large.

Figure 4:
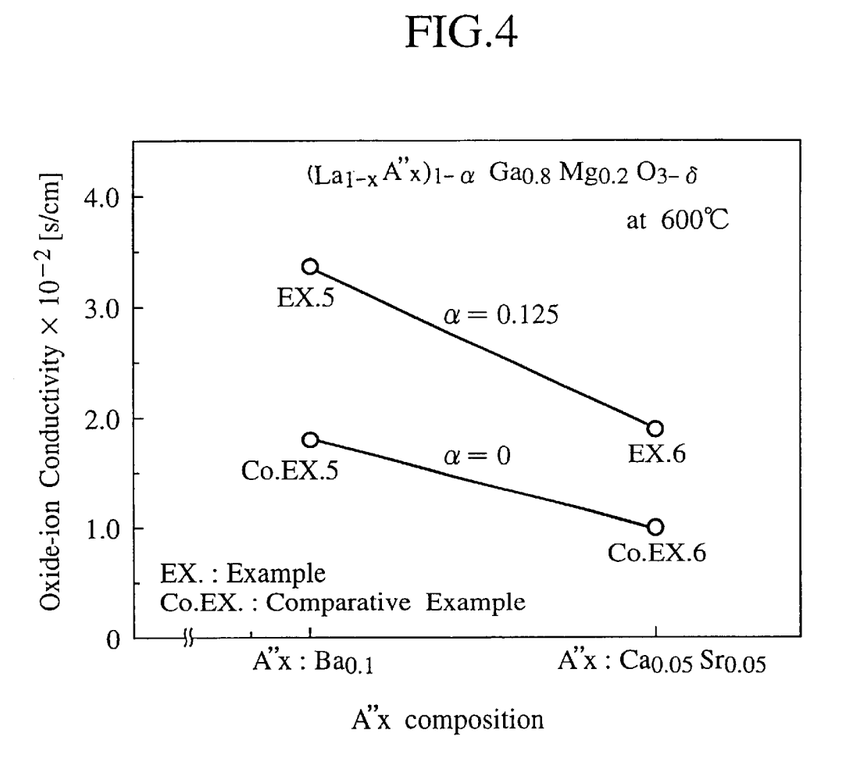
FIG. 4 is a graph showing the relationship among A" site compositions, the A site-deficient quantities ($\alpha$) and the oxide-ion conductivities in $(La_{1-x}A''_x)_{1-\alpha}Ga_{0.8}Mg_{0.2}O_{3-\delta}$ in each of the examples and the comparative examples.

FIG. 4 shows the relationship among the A" site compositions containing at least one of Sr, Ca and Ba, the A site-deficient quantities a and the oxide-ion conductivities of the gallate based complex oxide represented by the chemical formula $(A'_{1-x}A''_x)_{1-\alpha}(Ga_{1-y}B'_y)$ more specifically, $(La_{1-x}A''_x)_{1-\alpha}Ga_{0.80.8}Mg_{0.2}O_{3-\delta}$. The oxide-ion conductivity is higher when a=0.125 than when a=0.

Figure 5:
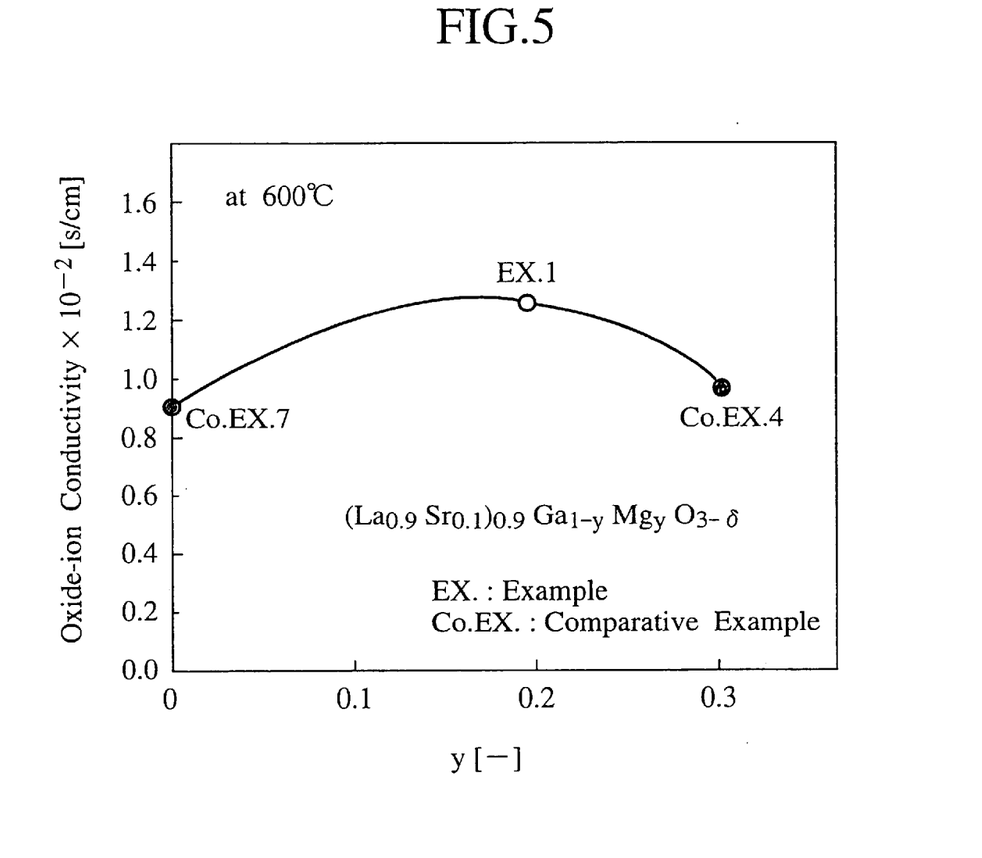
FIG. 5 is a graph showing the relationship between values of y and the oxide-ion conductivities in $(La_{0.9}Sr_{0.1})_{0.9}Ga_{1-y}Mg_yO_{3-\delta}$ in each of the examples and the comparative examples.

FIG. 5 shows the relationship between values of y and the oxide-ion conductivities of the gallate based complex oxide represented by the chemical formula $(A'_{1-x}A''_x)_{1-\alpha}(Ga_{1-y}B'_y)O_{3-\delta}$, more specifically, $(La_{0.9}Sr_{0.1})_{0.9}Ga_{1-y}Mg_yO_{3-\delta}$. When $0<y<0.2$, the larger the y value is, the higher the oxide-ion conductivity is.

Figure 6:
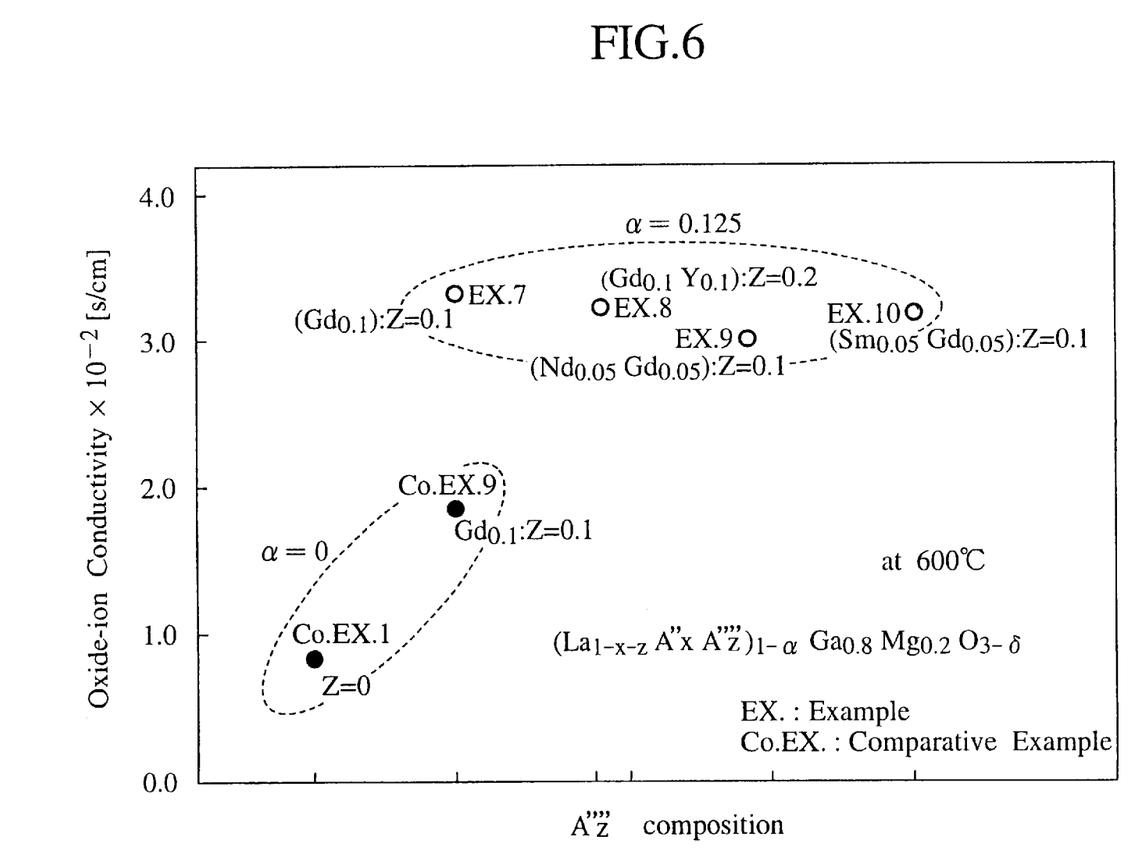
FIG. 6 is a graph showing the relationship among the A site compositions, the A site-deficient quantities a and the oxide-ion conductivities in $(La_{1-x-z}A''_xA'''_z)_{1-\alpha}Ga_{0.8}Mg_{0.2}O_{3-\delta}$ in each of the examples and the comparative examples.

FIG. 6 shows the relationship among the $A''''_z$ compositions, the A site-deficient quantities $\alpha$ and the oxide-ion conductivities of the gallate based complex oxide represented by the chemical formula $(A'''_{1-x-z}A''_xA''''_z)_{1-\alpha}Ga_{1-y}B_yO_{3-\delta}$, more specifically, $(La_{0.9-z}Sr_{0.1}A''''_z)_{1-\alpha}$. In the A'''' site of the example, at least one of Nd, Sm, Gd and Y is contained. In FIG. 6, $A''''_z$ compositions and values of z are described.

The oxide-ion conductivity is higher when Z=0.2 than when z=0 and z=0.1. The oxide-ion conductivity is higher when $\alpha$=0.125 than when $\alpha$=0.

Figure 7:
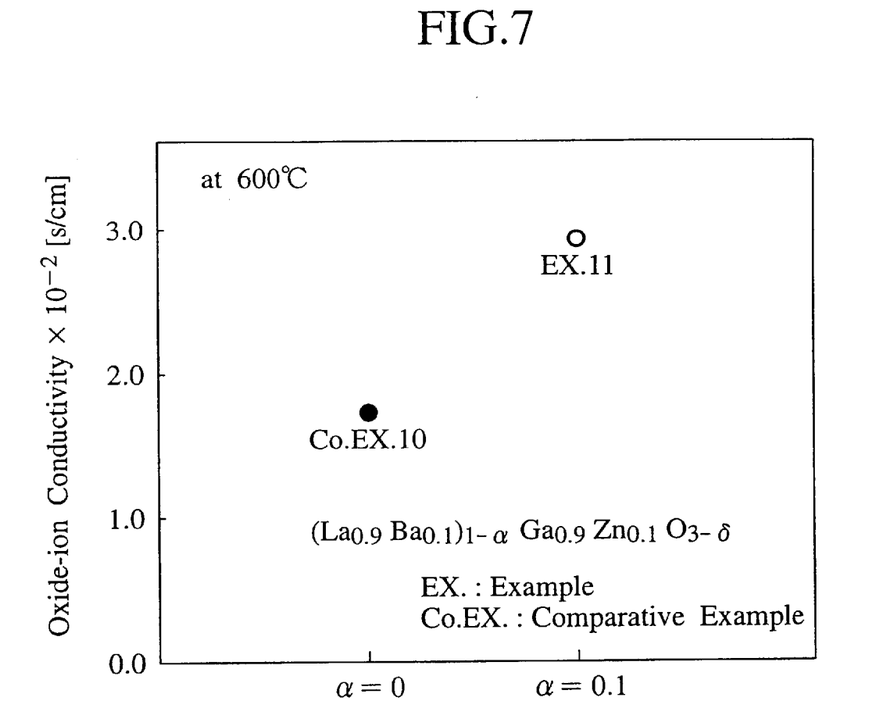
FIG. 7 is a graph showing the relationship between the A site-deficient quantity $\alpha$ and the oxide-ion conductivity in $(La_{0.9}Ba_{0.1})_{1-\alpha}Ga_{0.9}Zn_{0.1}O_{3-\delta}$ in each of the examples and the comparative examples.

FIG. 7 is the graph showing the relationship of the A site-deficient quantities $\alpha$ $\alpha$ and the oxide-ion conductivities of the gallate based complex oxide represented by the chemical formula $(A'_{1-x}A''_x)_{1-\alpha}(Ga_{1-y}B'_y)O_{3-\delta}$, more specifically, $(La_{0.9}Ba_{0.1})_{1-\alpha}Ga_{0.9}Zn_{0.1}O_{3-\delta}$, in which a part of the B site is substituted by Zn. The oxide-ion conductivity is higher when $\alpha$=0.1 than when $\alpha$=0.

The entire contents of Japanese Patent Application P2000-257590 (filed Aug. 28, 2000) are incorporated herein by reference.

Although the inventions have been described above by reference to certain embodiments of the inventions, the inventions are not limited to the embodiments described above. Modifications and variations of the embodiments described above will occur to those skilled in the art, in light of the above teachings.

The scope of the inventions is defined with reference to the following claims.

What is claimed is:

1. A solid electrolyte material, comprising:
an A site-deficient complex oxide represented by a chemical formula $A_{1-\alpha}BO_{3-\delta}$, containing at least Ga in the B site,
wherein the A site in the chemical formula contains at least one element selected from the group consisting of rare earth elements, Y and alkaline earth metal elements, and the $\alpha$ and $\delta$ satisfy the following expressions, respectively:

$0<\alpha<0.2$ $0<\delta<0.5$.

2. The solid electrolyte material according to claim 1, wherein the B site further contains at least one of Mg and Zn.

3. The solid electrolyte material according to claim 1, wherein the chemical formula is represented by the following formula:

$(A'_{1-x}A''_x)_{1-\alpha}Ga_{1-y}B'_yO_{3-\delta}$ where the A' site is a rare earth element and Y,
the A'' site contains at least one element selected from the group consisting of alkaline earth metal elements,
the B' site contains at least one of Mg and Zn, and
wherein the x and y satisfy the following expressions, respectively:

$0<x<0.2$ $0<y<0.2$.

4. The solid electrolyte material according to claim 1, wherein the chemical formula is represented by the following formula:

$(A'''_{1-x-z}A''_xA''''_z)_{1-\alpha}Ga_{1-y}B_yO_{3-\delta}$ where the A''' site is La,
the A'''' site is at least one element selected from the group consisting of Nd, Sm, Gd and Y, and
the x, y and z satisfy the following expressions:

$0<x<0.2$ $0<y<0.2$ $0<z<0.2$.

5. A method of manufacturing the solid electrolyte material set forth in claim 1, comprising:
mixing oxide materials of respective constituent elements;
calcinating the mixed materials at 1100 to 1200° C. for 2 to 10 hours;
grinding the calcinated materials to powder;
molding the powder; and
sintering the molded powder.

6. The method of manufacturing according to claim 5, wherein the sintering step is performed at sintering temperature of 1350 to 1550° C. for sintering time of 2 to 8 hours.

7. The method of manufacturing according to claim 5, wherein the grinding step makes the powder of which average grain diameter is in a range of 0.5 to 0.8 µm.

8. A solid oxide fuel cell, comprising:
the solid electrolyte material set forth in claim 1;
a cathode electrode formed on one surface of the solid electrolyte material; and
an anode electrode formed on the other surface of the solid electrolyte material.

* * * * *